United States Patent
Ahrens et al.

(10) Patent No.: US 10,372,329 B1
(45) Date of Patent: Aug. 6, 2019

(54) MANAGING STORAGE DEVICES IN A DISTRIBUTED STORAGE SYSTEM

(71) Applicant: Delphix Corporation, Menlo Park, CA (US)

(72) Inventors: Matthew Allan Ahrens, San Francisco, CA (US); Alexander Warner Reece, San Francisco, CA (US); George Raymond Wilson, Cumming, GA (US)

(73) Assignee: DELPHIX CORP., Redwood City, CA (US)

( * ) Notice: Subject to any disclaimer, the term of this patent is extended or adjusted under 35 U.S.C. 154(b) by 202 days.

(21) Appl. No.: 15/346,433

(22) Filed: Nov. 8, 2016

Related U.S. Application Data (60) Provisional application No. 62/253,095, filed on Nov. 9, 2015.

(51) Int. Cl.
*G06F 3/06* (2006.01)
*G06F 12/1009* (2016.01)

(52) U.S. Cl.
CPC .......... *G06F 3/0604* (2013.01); *G06F 3/0631* (2013.01); *G06F 3/0659* (2013.01); *G06F 3/0665* (2013.01); *G06F 3/0683* (2013.01); *G06F 12/1009* (2013.01); *G06F 2212/65* (2013.01)

(58) Field of Classification Search
CPC .... G06F 3/0604; G06F 3/0631; G06F 3/0659; G06F 3/06; G06F 12/1009; G06F 2212/65
USPC .......................................................... 711/154
See application file for complete search history.

(56) References Cited

U.S. PATENT DOCUMENTS

| | | | | |
|---|---|---|---|---|
| 5,875,456 | A * | 2/1999 | Stallmo | G06F 3/0607 711/114 |
| 6,363,457 | B1 * | 3/2002 | Sundberg | G06F 3/0607 711/114 |
| 8,060,772 | B2 * | 11/2011 | Abali | G06F 11/1092 711/111 |
| 9,250,823 | B1 * | 2/2016 | Kamat | G06F 3/0647 |
| 2011/0099321 | A1 * | 4/2011 | Haines | G06F 12/0246 711/103 |
| 2011/0138136 | A1 * | 6/2011 | Shitomi | G06F 3/0604 711/154 |
| 2014/0143391 | A1 * | 5/2014 | Tanigawa | G06F 9/45558 709/221 |

* cited by examiner

*Primary Examiner* — Reginald G Bragdon
*Assistant Examiner* — Aaron D Ho
(74) *Attorney, Agent, or Firm* — Fenwick & West LLP (57) ABSTRACT

Storage systems store data in a storage pool comprising storage devices or virtual devices. The storage pool may be allocated for a particular purpose. If a virtual device within the storage pool needs to be repurposed, the virtual device is removed from the storage pool. Data is moved from the removed virtual device to one or more target virtual devices. Segments of the source virtual device being removed are copied to target virtual devices. Mapping tables associating source segments with target segments are stored. If the storage system receives a request to access data stored on a virtual device that is removed, the storage system processes the mapping tables to determine where the data is stored.

19 Claims, 8 Drawing Sheets

MANAGING STORAGE DEVICES IN A DISTRIBUTED STORAGE SYSTEM

CROSS REFERENCE TO RELATED APPLICATION

This application claims the benefit of U.S. Provisional Application No. 62/253,095, filed on Nov. 9, 2015, which is incorporated by reference in its entirety.

BACKGROUND

This invention relates to managing data in a distributed storage system storing data across a plurality of devices in general and more specifically to managing data when one or more virtual devices are removed from a storage pool comprising a plurality of virtual devices.

Storage systems often distribute data across multiple storage devices. Use of multiple storage devices allows the storage system to scale when the amount of storage space required increases. Furthermore, data can be replicated across multiple storage devices to provide fault tolerance. However, management of data distributed across multiple storage devices is more complicated than data stored on a single device. Enterprises that store a large amount of data using such distributed system assign a system administrator or a database administrator to manage the storage systems of the enterprise. System administrators typically assign storage devices or portions of storage devices for specific purposes. For example, a set of storage devices may be used for development related activities, another set of storage devices may be used for testing, and another set of storage devices may be used for production.

A system administrator may over-estimate or under-estimate the amount of storage required for a particular purpose. If the system administrator over estimates the amount of storage used for a particular purpose, the system administrator may repurpose a storage devices for another purpose. System administrators may repurpose storage devices for other reasons, for example, if a new project is started, resources from existing projects may be used for the new project. If a storage device being used for a purpose is repurposed, the data stored on the storage device is moved out of the storage device. However, other storage devices may store references to data stored on this device. These references become outdated when the data referred to by them is moved. As a result, moving data from storage devices leads to inefficiencies that are not adequately addressed by conventional techniques.

SUMMARY

A file system stores data in a storage pool. The storage pool comprises a plurality of virtual devices. Data stored on one or more of these devices points at data stored in other virtual devices of the storage pool. A virtual device corresponds to one or more physical storage devices. A virtual device stores data as one or more segments, each segment representing a contiguous allocated portion of the virtual device.

The system receives a request to remove one or more virtual devices from the storage pool. For example, if a system administrator decides to repurpose a virtual device for some other project, the system administrator may remove the virtual device from the storage pool. The system copies data of each segment from the device to be deleted, referred to as the source device, to one or more segments of another virtual device, referred to as the target virtual device. The storage system stores a mapping table associating each source segment of the source virtual device to the corresponding target segments of the target virtual device.

The storage system receives a request to access data from the device that was previously removed. The storage system uses the mapping tables to identify the target device on which the requested data is stored. The storage system retrieves the data from the identified target device.

In an embodiment, a plurality of virtual devices is removed from the storage pool. The storage system loads the mapping tables corresponding to the plurality of removed virtual devices in reverse chronological order in which the virtual devices were removed.

Storage systems that use storage pools as discussed herein may be used for storing virtual databases that share data across virtual databases and for storage systems that share database blocks across point-in-time copies of database retrieved from a source database system. The storage system may be used for other applications, such as backup applications, testing and development purposes, and data warehousing.

The features and advantages described in the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments allow a storage system storing data across a plurality of storage devices, for example, a storage pool to remove a storage device from the plurality. The data of the storage device being removed from plurality is moved to other storage devices of the storage pool.

A storage device (or storage medium) allows a computer system to store (or record) data temporarily or permanently. A storage device is a hardware device that allows storage and retrieval of data. A storage device may be a virtual device that uses a single physical storage device or a plurality of physical storage devices. The virtual device presents an interface that allows a software module or a user to access the data without considering the configuration of the physical devices underneath the virtual device. Accordingly, a software module storing data on the virtual storage device is agnostic of the actual physical storage device or devices used by the virtual storage device.

A storage system may store data in a redundant array of independent disks (RAID) that combines multiple physical storage devices into a single logical unit. Example of such storage system is ZFS (zettabyte file system) that allows storage of multiple snapshots that share data blocks.

A storage system may store virtual databases that share database blocks using a storage pool. Since virtual databases share database blocks, the amount of storage required for a large virtual databases may not be significantly high. More specifically, if N virtual databases are created from a source database each representing the state of the source database at a different point in time, the storage required for storing data of the N virtual databases is likely to be significantly less than the amount represented by a value that is N times the storage of a single virtual database.

The amount of storage required for N virtual databases depends on factors such as a number of database blocks that changed between two points in time corresponding to two virtual databases and number of database blocks that are written to in each virtual database. Accordingly, a database administrator or system administrator may find it difficult to predict the amount of storage required for a project using some or all of these virtual databases. The amount of storage may also change over time as some virtual databases may need more storage if they are frequently being updated and other virtual databases use small amount of storage if they are primarily used in a read only fashion. Accordingly, a database administrator may get a better estimate of the actual storage needs of various projects over time and may have to repurpose storage devices used for a project P1 to another project P2 if the project P1 was allocated significantly more storage than its actual need or actual usage.

A database administrator may determine that a particular storage device is being under-utilized and needs to be repurposed for some other project. Accordingly, the database administrator requests the storage system to remove the storage device from the storage pool. Since the virtual databases share database blocks, the storage device being removed may store database blocks that are shared with data on other storage devices.

Virtual Databases

A storage system 100 stores multiple point-in-time copies of a source database using snapshots. These copies of snapshot share database blocks. Sharing of data blocks across snapshots allows efficient storage of the point-in-time copies of the source database. Virtual databases corresponding to points in time of the source database are provisioned using the storage system. Virtual database systems are described in U.S. patent application Ser. No. 12/603,541 filed on Oct. 21, 2009, now issued as U.S. Pat. No. 8,150,808, which is incorporated by reference herein in its entirety. Storage systems may be used for other purposes, for example, for storing point in time copies of file systems for purposes of taking backups of file systems. Backup systems based on stored snapshots of data are described in U.S. patent application Ser. No. 13/183,131 filed on Jul. 14, 2011, now issued as U.S. Pat. No. 8,548,944, which is incorporated by reference herein in its entirety.

A virtual database created for a point in time is stored as a set of files that contain the information of the database as available at that point in time. Each file includes a set of database blocks and the data structures for referring to the database blocks. A virtual database may be created on a database server by creating the database files for the source database corresponding to the state of the source database at a previous point in time, as required for the database server.

The files of the virtual database are made available to the database server using a file sharing mechanism, which links the virtual database to the appropriate database blocks stored on the storage system. The process of making the virtual database available to a database server is called "provisioning" the virtual database. Multiple virtual databases can be provisioned based on the state of the source database at the same point in time.

Figure 1:
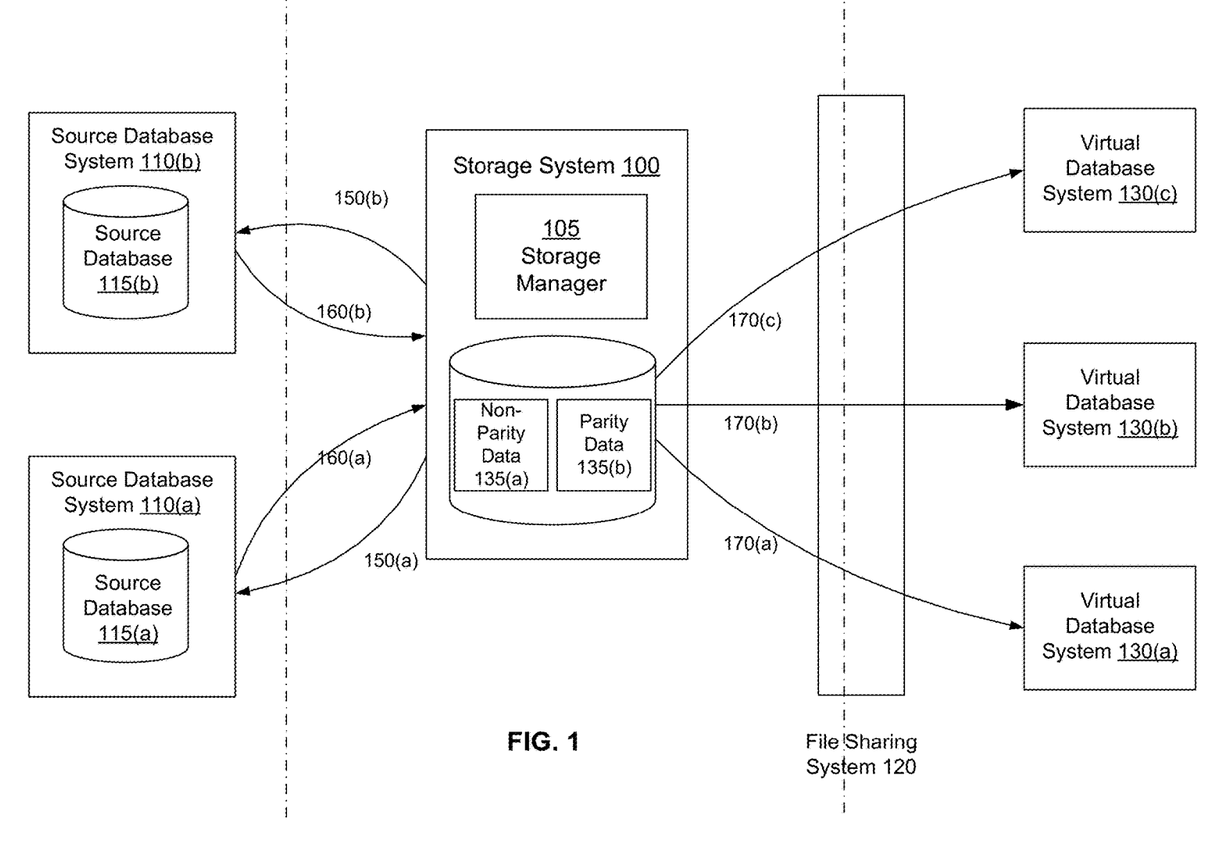
FIG. 1 is diagram illustrating copying of information from a source database to a storage system for provisioning as virtual databases, according to an embodiment of the invention.

FIG. 1 is a diagram illustrating copying of information from a source database to a storage system for provisioning as virtual databases, according to an embodiment of the invention. The source database systems 110 manage data for an organization. The storage system 100 retrieves data associated with databases from one or more source database systems 110 and stores the data in an efficient manner, further described below. A database administrator user interface allows a database administrator to perform various actions supported by the storage system 100.

The storage system 100 sends a request 150 for data to a source database system 110. The source database system 110 responds by sending information stored in the source database as a stream of data 160. The request 150 is sent periodically and the source database system 110 responds by sending information representing changes of data stored in the source database since the last response 160 sent by the source database system 110. The storage system 100 receives the data 160 sent by the source database system 110 and stores the data. The storage system 100 stores the information efficiently, for example, by keeping versions of database blocks that have changed and reusing database blocks that have not changed.

To create a virtual database, the storage system 100 creates files that represent the information corresponding to the source database system 110 at a given point in time. The storage system 100 exposes 170 the corresponding files to a virtual database system 130 using a file sharing system 120. The virtual database system 130 runs a database server that can operate with the files exposed 170 by the storage system 100. Hence, a virtual copy of the source database is created for the virtual database system 130 for a given point in time in a storage efficient manner.

A database block may be shared between different files, each file associated with a different virtual database. In particular, a database block is shared if the corresponding virtual database systems 130 are only reading the information in the database block and not writing to the database block. In one embodiment, a virtual database manager of the storage manager 105 makes copies of the database blocks only if necessary. For example, a particular database block may be shared by multiple virtual databases that read from the same database block. But if one of virtual database systems 130 attempts to write to the database block, a separate copy of the database block is made because the writing operation causes that database block to be different for the virtual database corresponding to that virtual database systems 130 than it is for the other virtual databases.

Since different point-in-time copies and different virtual databases share database blocks, the amount of storage used by a point-in-time copy or by a virtual database is difficult to estimate. For example, the amount of storage used by a virtual database may increase over time if more and more database blocks of the virtual database are written to. Another set of virtual databases may require very small amount of storage if these virtual databases share most of the database blocks. Accordingly, the total amount of storage required by several virtual databases may be only slightly greater than the amount of storage required by a single virtual database.

If a system administrator assigns storage devices for various purposes, the system administrator estimates the amount of storage required for each purpose. The system administrator assigns one or more storage devices for each purpose based on the estimates of storage requirements. However, as discussed above it is likely that the estimates of the system administrator are overly conservative and the actual amount of storage required is less than expected. In this situation, the system administrator may request the storage system 100 to repurpose the storage devices. For example, is a storage pool comprising a plurality of storage devices is used for a project, the system administrator may request the storage system 100 to remove some of the storage devices of the storage pool. Alternatively, if the storage pool is used for multiple purposes, with a subset of storage devices assigned for each specific purpose, the system administrator may request data from one or more storage devices to be moved out of the storage device so that the storage device can be used for another purpose.

The storage system 100 receives requests to remove a storage device from a storage pool or to simply move the data stored in the storage device to one or more remaining storage devices of the storage pool. The storage system may receive a request to move data from a storage device from a particular subset of the plurality of storage devices assigned for a project. Embodiments disclosed here manage such requests for removing a device from a storage pool or for moving data from a storage device to other storage devices of a storage pool.

Data blocks stored in the storage system include pointers to other data blocks, for example, if a virtual database uses data blocks from multiple point-in-time copies (a pointer may be also referred to herein as a reference to a data block, or a location identifier of a data block.) The storage system 100 may have stored the data blocks on different storage device of the storage pool. As a result, if a storage device is removed from a storage pool, several other storage devices may store pointers to data blocks stored on the storage device being removed. The storage manager 105 of the storage system 100 manages removal of storage devices from a storage pool and also manages data structures and instructions for tracking data of storage devices as they are removed. Although virtual database are shown as an application of the storage system configured to remove storage devices based on embodiments disclosed, the techniques disclosed herein are not limited to virtual databases and can be used in any file system that stores data across multiple storage devices and allows data blocks from one storage device to point at data blocks of other storage devices.

Removing a Virtual Device from a Storage Pool

FIGS. 2A-2D illustrate removal of virtual devices from a storage pool, according to an embodiment of the invention. The storage system 100 stores data in a storage pool comprising a plurality of devices. FIGS. 2A-2D illustrate how data is moved from the devices being removed to the remaining devices of the storage pool.

In an embodiment, the devices of the storage pool are virtual devices. A virtual device presents an interface of a single device to a system using the virtual device. However, the virtual device may be implemented using one or more physical devices underneath. The virtual device translates requests to manage data of the virtual device to requests processed by the underlying physical devices.

The example storage system 100 shown in FIG. 2 stores data using a storage pool comprising virtual devices D1, D2, D3, D4, and D5. Although FIG. 2 shows a storage pool with five virtual devices, the principles illustrated by the figures are applicable to storage pools with more or fewer virtual devices. A virtual device may store data in one or more segments. However for illustration purposes, each virtual device shown in FIG. 2A has a single segment. For example, virtual device D1 has segment S1, virtual device D2 has segment S2, virtual device D3 has segment S3, virtual device D4 has segment S4, and virtual device D5 has segment S5.

Figure 2A:
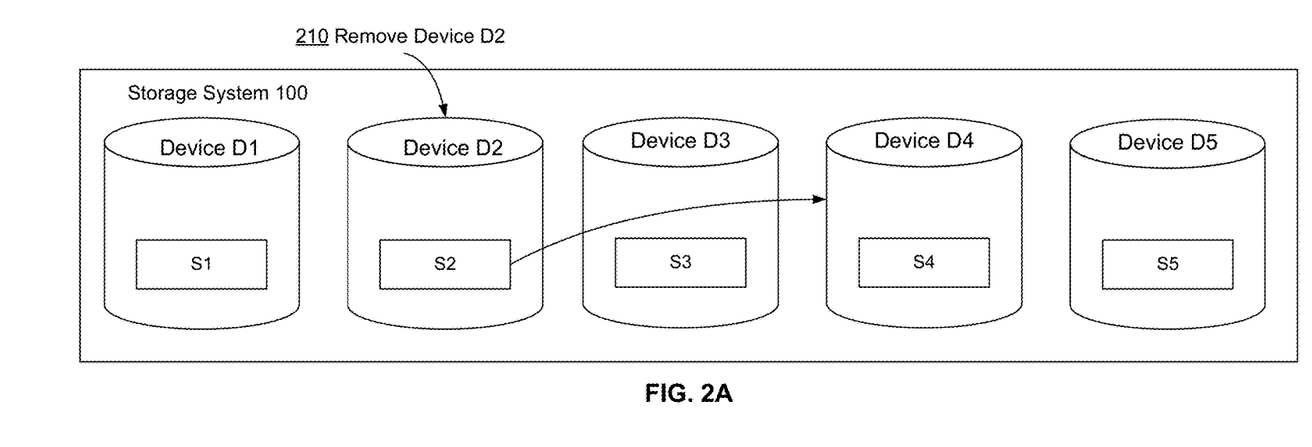
FIGS. 2A, 2B, 2C, and 2D illustrate removal of virtual devices from a storage pool, according to an embodiment of the invention.
Figure 2B:
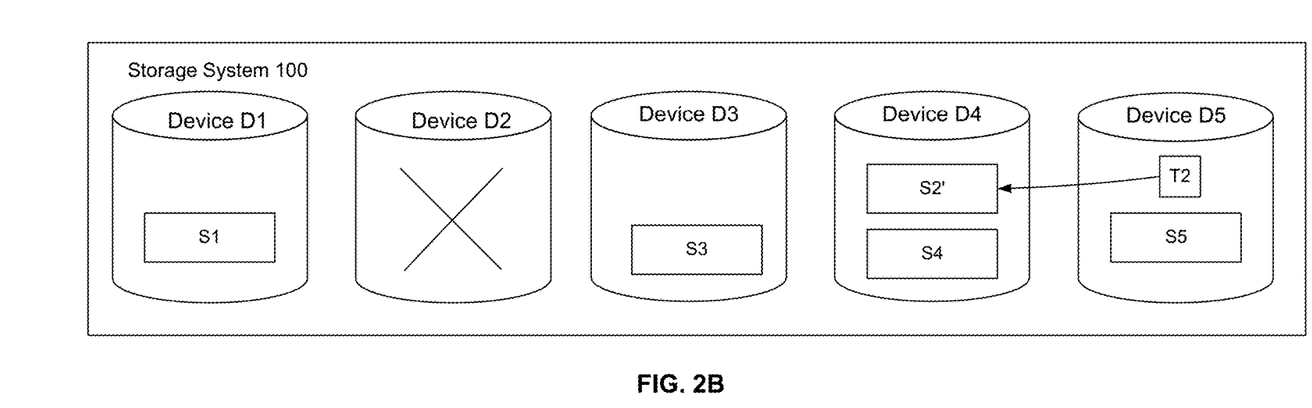

As shown in FIG. 2A, the storage system 100 receives 210 a request to remove device D2. The storage system 100 identifies D4 as the target virtual device to which data of the segment S2 of the virtual device D2 can be moved. The storage system 100 copies the data of the segment S2 to segment S2' of device D4 as shown in FIG. 2B. Once a device is removed from the storage pool, the storage system marks the device as an indirect virtual device. This is so because pointers to data stored of the indirect virtual device do not point at the data stored on the indirect virtual device but indirectly point at the copy of the data stored on another virtual device. As shown in FIG. 2B, the storage system 100 removes the data from virtual device D2 and marks the virtual device D2 as an indirect virtual device.

The storage system 100 also stores a table T2 on virtual device D5. The table T2 maps segments of the device D2 that is removed to new locations of the corresponding segments where the data is copied. The table T2 may be stored on any virtual device of the storage system 100 that is not removed. For example, table T2 may be stored on virtual device D1. If the storage system 100 receives a request to read a data block that was previously stored on virtual device D2, the storage system 100 determines that the virtual device D2 is an indirect virtual device and accordingly finds the mapping table T2 to determine where the data copied to the virtual device D4 is located.

Figure 2C:
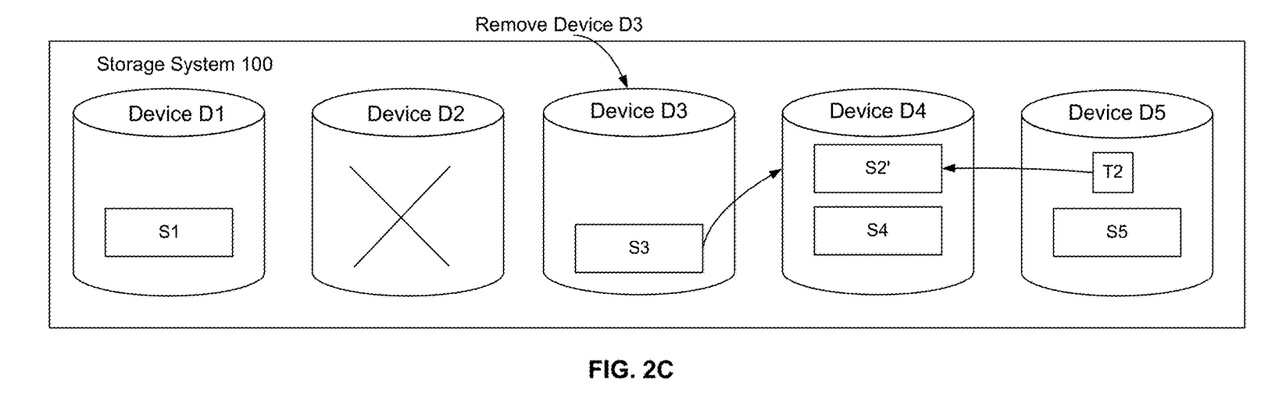
Figure 2D:
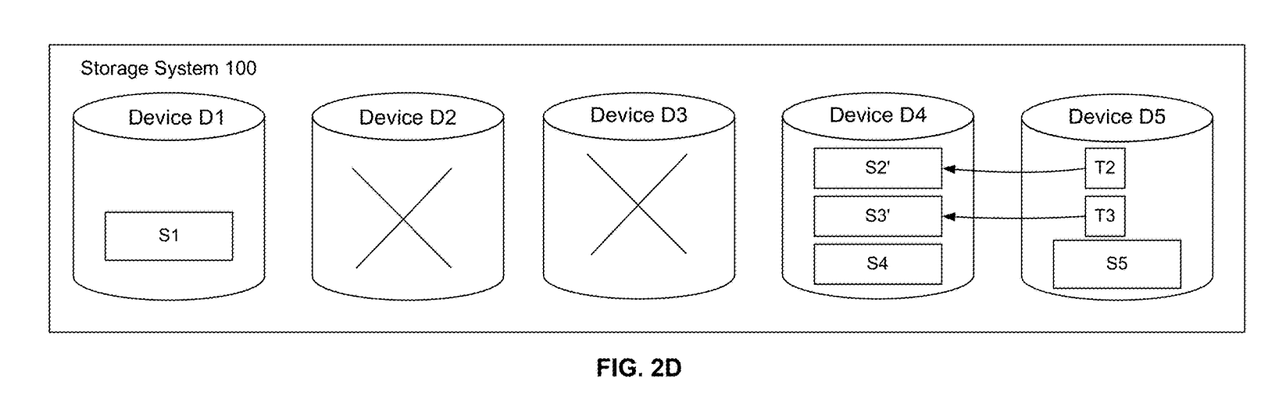

FIG. 2C shows that subsequently the storage system 100 receives a request to remove virtual device D3. The storage system 100 identifies virtual device D4 as the target device for storing the segment (or segments) of virtual device D3. The storage system 100 may identify other virtual devices as the target virtual devices for storing the segments of virtual device D3. The storage system 100 copies the segment S3 to segment S3' of virtual device D4. The storage system 100 stores a table T3 on virtual device D5 mapping segments of the virtual device D3 being removed and the corresponding segments of virtual device D4 to which the data of the segments of virtual device D3 is copied. FIG. 2D shows the table T3 stored on virtual device D5. However the table T3 may be stored on another virtual device of the storage system 100 that is not yet removed. The file system 20 marks the virtual device D3 as an indirect virtual device indicating the virtual device D3 is removed. Accordingly, if the storage system 100 receives requests for data that was previously stored on virtual device D3, the storage system 100 uses the table T3 to determine the new location of the data.

FIG. 2 shows one example of a set of devices being removed from a storage pool. It is possible that a storage device storing a mapping table is removed. Accordingly determining where a data block is stored may require accessing multiple lookup tables to determine where the data is located.

System Architecture

Figure 3:
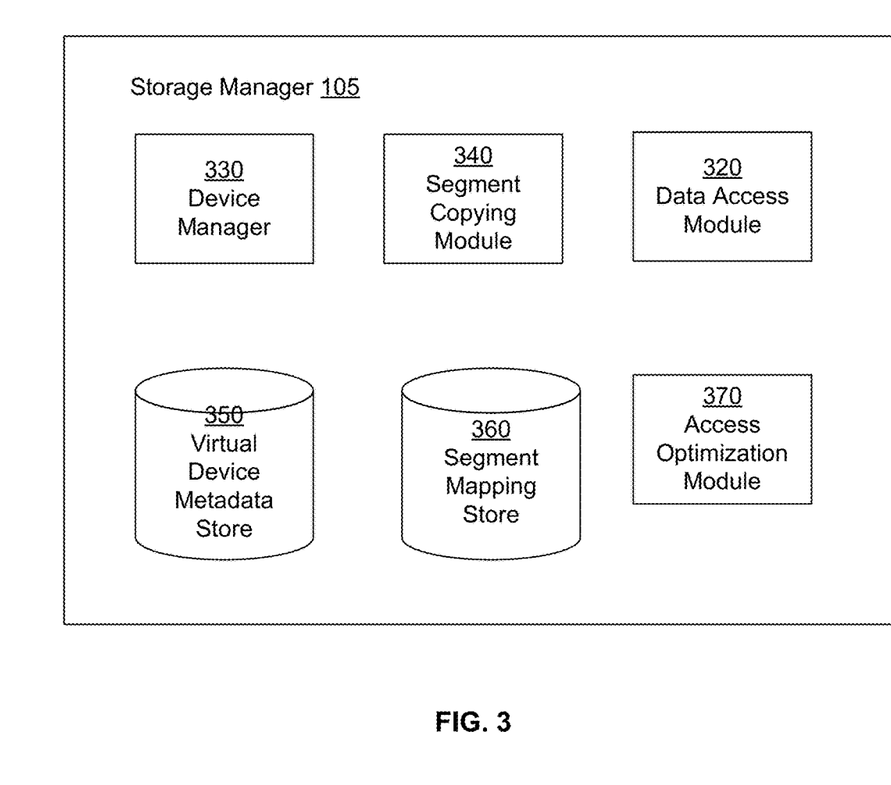
FIG. 3 illustrates the architecture of a storage manager of a storage system for managing virtual devices in a storage pool, in accordance with an embodiment of the invention.

FIG. 3 illustrates the architecture of a storage manager of a storage system for managing virtual devices in a storage pool, in accordance with an embodiment of the invention. The storage manager 105 comprises a device manager 330, a segment copying module 340, a virtual device metadata store 350, a data access module 320, an access optimization module 370, and a segment mapping store 360. In alternative configurations, different and/or additional modules can be included in the storage system 100. Furthermore, functions performed by a particular module may be performed by other modules than those indicated herein. The storage system 100 may comprise multiple computer processors. Accordingly, various components of the storage manager 105 may be stored and executed on one or more computer processors. Some components may be stored on a specific computer processor of the distributed system and some components may be replicated across multiple computer processors.

The virtual device metadata store 350 stores metadata describing virtual devices of the storage system 100. The metadata includes information identifying the virtual device, for example, a name of the virtual device as used by programs storing data in the storage system. The metadata includes a mapping from each virtual device to the physical devices used for storing data of the virtual device. If the storage system 100 implements multiple storage pools, the virtual device metadata store 350 includes an association between virtual devices and storage pools.

For a storage pool, the metadata stored in the virtual device metadata store 350 includes information indicating whether a virtual device used for the storage pool is removed. The storage system 100 marks virtual devices that are removed from the storage pool as indirect virtual device. The storage system 100 may store a flag indicating that a virtual device is indirect if the virtual device that was previously used in the storage pool is removed. Unless otherwise indicated, a virtual device is assumed to be direct virtual devices. For example, if the storage system 100 receives a request to received data for a data block using a pointer to the data block, the storage system 100 determines whether the pointer identifies an indirect virtual device of a direct virtual device. If the virtual device is a direct virtual device, the storage system 100 retrieves the data from the virtual device. If the virtual device is an indirect virtual device, the storage system 100 accesses a mapping table storing information describing where the data of the indirect virtual device is stored and access the data based on that information.

The segment mapping store 360 stores information describing where data moved from an indirect virtual device is stored. In an embodiment, the segment mapping store 360 stores one or more mapping tables that map segments copied from an indirect virtual device to segments of other virtual devices. For each segment S1 stored on an indirect virtual device when the device was removed from the storage pool, the mapping table stores an association from segment S1 to segment S1' where segment S1' is the new location of the segment on another virtual device. A segment S1 of the indirect virtual device may be mapped to multiple segments if the segment is split into smaller segments before being copied to other virtual devices. For example, the mapping table may store an association from segment S1 to segments S1' and S1" where S1' and S1" are either stored on the same target virtual device or on different target virtual devices.

The mapping table for a storage pool may include mapping for multiple indirect virtual devices. For example, if the storage system 100 receives a request to remove virtual device D1, the storage system 100 stores the mapping of segments moved out of virtual device D1 in the segment mapping store 360. Subsequently, if the storage system 100 receives a request to remove virtual device D2, the storage system 100 stores the mapping of segments moved out of virtual device D2 in the segment mapping store 360.

The data of the mapping tables of the segment mapping store 360 may be distributed across multiple virtual devices. For example, the mapping table describing segments of virtual device D1 may be stored on virtual device D2. If the storage system 100 receives a request to remove the virtual device D2, the storage system 100 may store the mapping table corresponding to the indirect virtual device D2 on a virtual device D3. However, the data of the virtual device D2 (including a portion of the mapping table) may be moved to a virtual device D4. Accordingly, a portion of the segment mapping store 360 is stored on virtual device D3 and another portion on virtual device D4.

In an embodiment, the segment mapping store 360 stores the mapping information as associations between tuples describing segments. Each tuple describing a segment may specify a virtual device id, an offset from which the segment begins, and a length of the segment. The segment mapping store 360 may store an association from source tuples to target tuples, for example, (dev1, offset1, length1)→(dev2, offset2). The source tuple specifies dev1 as the identifier of the indirect virtual device, offset1 as the offset or location on the device dev1 where the segment started, and length1 as the length of the segment on the device dev1 (before the segment was copied). The target tuple specifies the identifier of the target device as dev2 and the offset on the target device as offset2. Since the entire segment of device dev1 is mapped to a single segment on the target device dev2, there is no need to specify the length of the segment in the target tuple.

If the segment being moved from a virtual device is split into two segments stored separately, the mapping table stores two pairs of tuples. For example, a segment S1 may be split into two segments S11 and S12 and moved into two target segments S11' and S12'. Accordingly, the mapping table would store an association from t11→t11' and another association t12→t12' where t11 is a tuple describing segment S11, t11' is the tuple describing segment S11', t12 is a tuple describing segment S12, and t12' is the tuple describing segment S12'.

The segment copying module 340 identifies the target segment or segments for copying each segment of a device being removed. The segment copying module 340 performs the copying of the source segments stored on the source virtual device being removed to the target virtual device or devices. The segment copying module 340 inspects the target virtual device to determine whether there is a contiguous storage region (or portion) that is free on a target virtual device and is large enough to allow storing the data of the source segment. If the segment copying module 340 determines that there is no free contiguous storage region on the target virtual device that can store the source segment, the segment copying module 340 identifies two or more separate contiguous regions on the target virtual device (or on multiple target virtual devices). In this situation, the segment copying module 340 splits the source segments into smaller segments and copies them to separate segments on target virtual devices. The segment copying module 340 may split a data block and copy one part of the data block to one segment and another part of the data block to another segment. If a single data block is copied to two or more segments, the storage system 100 may not be able to represent that data block using a pointer to a single location. The storage system 100 uses the mapping table to determine the locations of each part of such a data block that is stored in a separate segment.

The device manager 330 manages the overall process of removing a virtual device from the storage pool. Accordingly, the device manager 330 iterates through all segments of the virtual device being removed to determine one or more target virtual devices to which the segments can be copied. Accordingly, the device manager 330 selects the target virtual devices for storing the data of a virtual device being removed. The device manager 330 invokes the segment copying module 340 to perform the copying of the segments. Once the data of the virtual device is copied, the device manager 330 marks the virtual device as an indirect virtual device, i.e., a virtual device that is removed from the storage pool.

The data access module 320 receives data access requests and determines the location of the requested data. For example, a data block may store pointers to other data blocks. The data access module 320 receives a pointer to a data block and determines where the data block is stored in the storage system 100. A data block pointer identifies a virtual device on which the data block is stored and also specifies an offset within the virtual device identifying the location of the data block. The data access module 320 retrieves information identifying the virtual device from the pointer. The data access module 320 determines whether the virtual device is an indirect virtual device (that has been removed from the storage pool) or a direct virtual device (that is still an active virtual device of the storage pool.) If the data access module 320 determines that the virtual device identified in the data pointer is a direct (or active) virtual device of the storage pool, the data access module 320 retrieves the data available at the specified offset on the virtual device. If the data access module 320 determines that the virtual device is an indirect virtual device, the data access module 320 uses the mapping table specifying the new locations for the segments of the indirect virtual device to determine the new location of the data corresponding to the pointer. If a data block is split across a plurality of segments, the data access module accesses the different portions of the data block and combines them to create the full data block.

Figure 6:
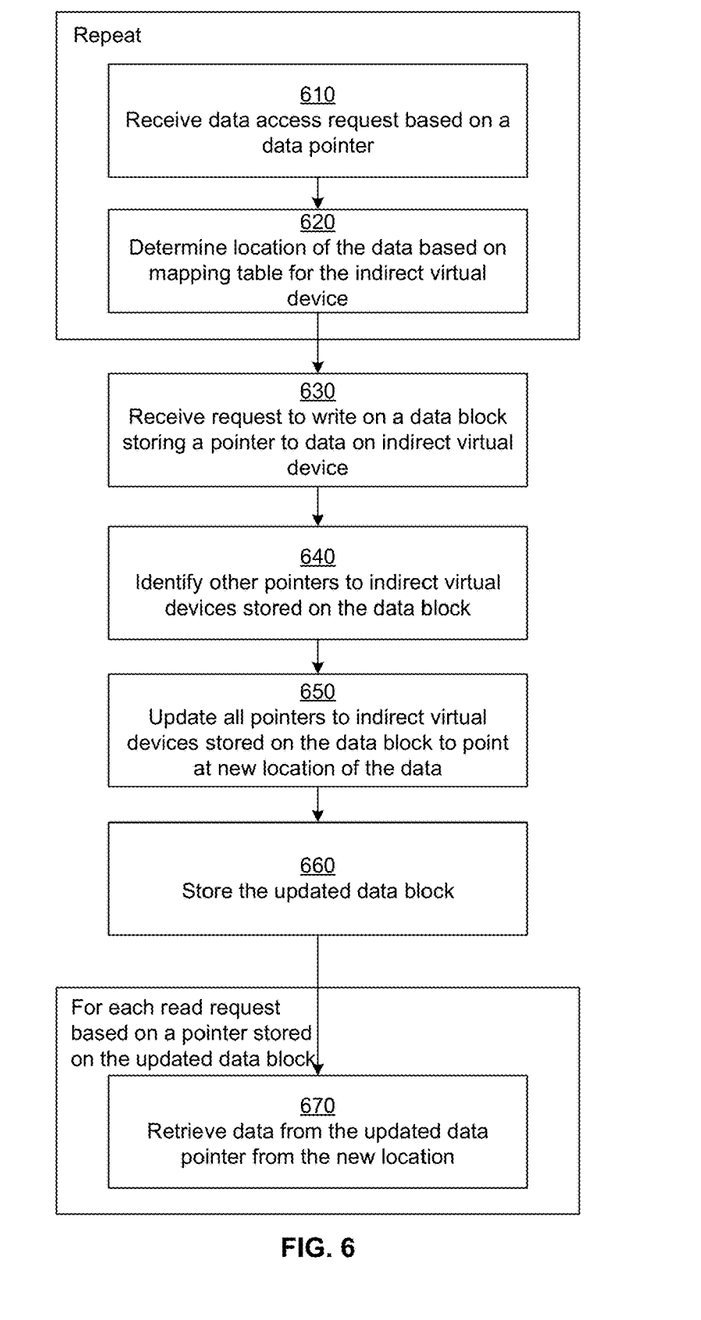
FIG. 6 shows a flowchart illustrating a process for optimizing performance of data access in the storage system, according to an embodiment of the invention.

The access optimization module 370 optimizes performance of data access by converting pointers to indirect virtual devices to corresponding pointers to direct virtual devices where the data is located. Accordingly, read operations based on indirect virtual devices are made more efficient since they do not have to access the mapping table corresponding to the indirect virtual device and can read the data based on the location specified in the pointer without going through a level of indirection. The details of the process used by the access optimization module 370 are illustrated in the flowchart of FIG. 6.

Managing Virtual Devices of a Storage Pool

Figure 4:
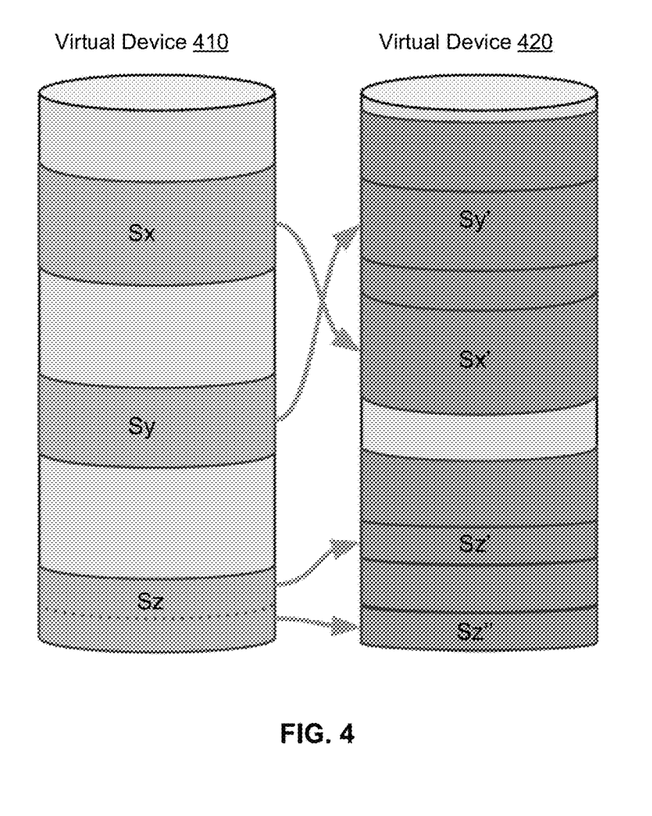
FIG. 4 shows an example illustrating copying of segments from a virtual device being removed from the storage pool to another virtual device, according to an embodiment of the invention.

FIG. 4 shows an example illustrating copying of segments from a virtual device being removed from the storage pool to another virtual device, according to an embodiment of the invention. The storage system 100 receives a request to remove source virtual device 410. The device manager 330 identifies target virtual device 420 as the destination for the segments of the source virtual device 410. The segment copying module 340 executes a process or a thread that iterates through all segments of the source virtual device 410 and copies them to the target virtual device 420. The segment copying module 340 copies data of segment Sx of virtual device 410 to segment Sx' of the virtual device 420. The segment copying module 340 copies data of segment Sy of virtual device 410 to segment Sy' of the virtual device 420. The segment copying module 340 determines that there is no contiguous region of virtual device 420 left that can store the data of the segment Sz. Accordingly, the segment copying module 340 copies data of segment Sz of virtual device 410 to segments Sz' and Sz'' of the virtual device 420.

FIG. 4 illustrates that the storage system 100 may split a segment into multiple segments on the target virtual device if there is no contiguous portion of the target virtual device that is large enough to store the data of the segment being copied. Similarly, the storage system 100 may combine a plurality of smaller segments of the source virtual device into a single large segment on the target virtual device if there is a contiguous portion of the target virtual device that is large enough to store the combined data of the plurality of segments of the source virtual device.

Figure 5:
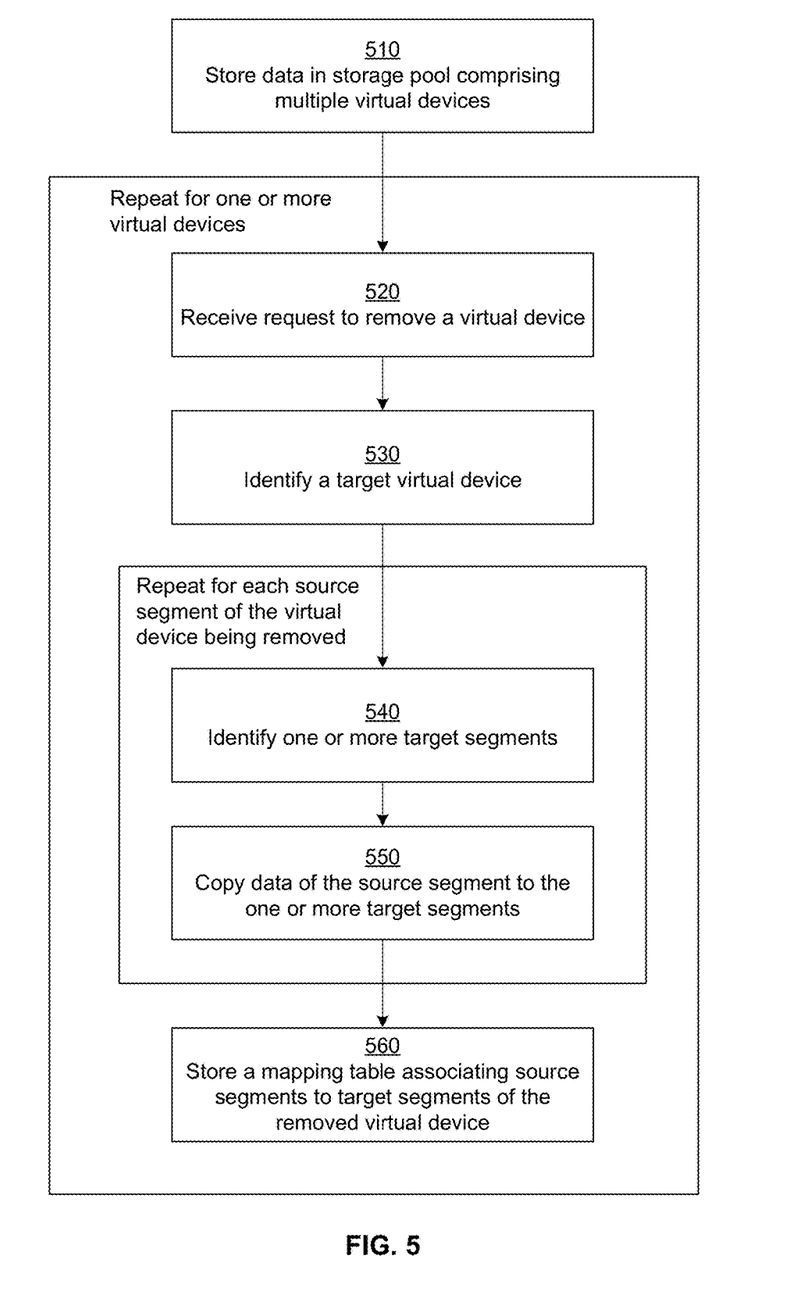
FIG. 5 shows a flowchart illustrating a process for managing removal of virtual devices from a storage pool, according to an embodiment of the invention.

FIG. 5 shows the process for managing removal of virtual devices from a storage pool, according to an embodiment of the invention. The storage system 100 stores 510 data in a storage pool comprising multiple virtual devices. The data on each virtual device is organized as data blocks. The data stored on one virtual device may include pointers to data stored on another virtual device.

The storage system 100 receives 520 a request to remove a virtual device from the storage pool and performs the following steps in response. These steps may be performed in response to requests received by the storage manager 105 to move data from these devices to remaining devices of the storage pool. These requests may be received at various points in time and other requests may be received by the storage manager 105 in between requests to remove devices. For example, the storage manager 105 may receive requests to store new point-in-time copies of the source database, requests to create virtual databases, requests related to various operations based on the virtual databases, for example, update records, delete records, create records, and so on in between requests to remove virtual devices from a storage pool.

The request to remove the virtual device comprises information identifying the virtual device being removed. The virtual device being removed is also referred to herein as the source virtual device. In response to remove the virtual device from the storage pool, the storage system 100 copies the data of the virtual device to other virtual devices of the storage pool and marks the virtual device as an indirect virtual device. Subsequently, the virtual device is empty and available for storing other data or the virtual device may be removed from the storage pool.

In some embodiments, the storage pool is divided into subsets of virtual devices, each subset used for a specific project or purpose. The device manager 330 receives a request to repurpose a virtual device from one project or purpose to another project or purpose. In these embodiments, the storage manager 105 copies the data of the source virtual device to other virtual devices of the storage pool. The device manager 330 may receive a request to move all or a portion of data of a source virtual device to other virtual devices of the storage pool. The following description refers to the request as a request to remove the virtual device, although the steps or operations apply to other types of requests in which data of the source virtual device is being moved out of the source virtual device to other virtual devices of the storage pool.

The device manager 330 identifies 530 a target virtual device for storing the data of a virtual device being removed. In an embodiment, the device manager 330 may identify 530 more than one target virtual devices from the storage pool for storing the data of the virtual device being removed. For example, if the amount of the data stored in the virtual device is too large to be stored in any single virtual device remaining in the storage pool, the device manager 330 identifies a plurality of target virtual devices and copies the data of the virtual device being removed to the identified plurality of target virtual devices. The following description assumes that the data of the virtual device being removed is copied to a single target virtual device although the techniques disclosed herein apply to data of a virtual device being copied to a plurality of target virtual devices.

The device manager 330 invokes the segment copying module 340 for copying data of the virtual device being removed to the target virtual device. The segment copying module 340 identifies 540 source segments of the source virtual device and performs the following steps for each source segment identified. The segment copying module 340 identifies one or more target segments for storing the data of the identified source segment. If the segment copying module 340 determines that a contiguous portion of a target virtual device is larger than the size of the source segment, the segment copying module 340 identifies a part of the contiguous portion of the target virtual device having a size at least as large as the size of the source segment as a target segment. If the source segment is larger than any available contiguous portion on the target virtual device, the segment copying module 340 identifies a plurality of contiguous portions of one or more target virtual devices such that the total amount of available storage in the plurality of contiguous portions is at least as large as the source segment. The segment copying module 340 marks the identified contiguous portions of the one or more target virtual devices as target segments. The segment copying module 340 copies 550 the data of the source segments to the identified target segments.

The device manager 330 stores 560 a mapping table representing the mapping from the source segments to the corresponding target segments to which the data of the source segment is copied in the segment mapping store 360. In an embodiment, the device manager 330 marks the source virtual device as empty and stores metadata describing the source virtual device as an indirect virtual device in the virtual device metadata store 350.

If the storage manager 105 receives a request to access data of a data block that is stored on an indirect virtual device, the storage manager 105 uses the mapping of segments of the indirect virtual device stored in the segment mapping store 360 to determine the location in the storage pool where the data block is currently stored. The storage manager 105 accesses the data from the target segment corresponding to the source segment that previously stored the data block.

In an embodiment, the storage system 100 stores mapping tables associating the locations of the segments from indirect virtual devices to their current locations on direct virtual devices distributed across multiple virtual devices. As an example, the storage system 100 may store a mapping table corresponding to an indirect virtual device D1 on a virtual device D2. Subsequently, the storage system 100 may receive a request to remove the virtual device D2. Accordingly, the virtual device D2 becomes an indirect virtual device and the data of the segment storing the mapping table may be copied to a virtual device D3. However, the mapping table storing the locations of segments for the indirect virtual device D2 may be stored on a virtual device D4. As a result, the mapping tables corresponding to the indirect virtual devices D1 and D2 are stored on two different virtual devices D3 and D4.

Figure 7:
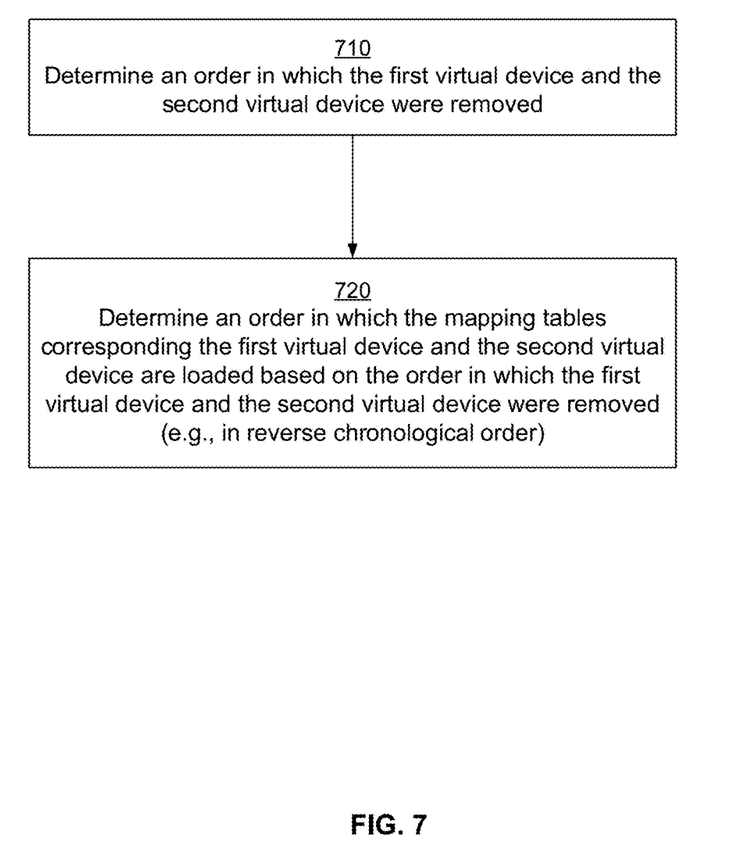
FIG. 7 illustrates a flowchart of a process for loading mapping tables corresponding to a first virtual device and a second virtual device, in accordance with an embodiment.

The data access module 320 retrieves (or loads or processes) the mapping tables corresponding to the various indirect devices to determine where data referred to by a data pointer is located. In an embodiment, the data access module 320 retrieves the mapping tables based on an order in which the virtual devices corresponding to the mapping tables were removed. In an embodiment, the data access module 320 retrieves the mapping tables in an order that is reverse of the chronological order in which the virtual devices corresponding to the mapping tables were removed. For example, if virtual device D1 was removed before virtual device D2, the mapping table corresponding to virtual device D2 is retrieved before the mapping table corresponding to virtual device D1 is retrieved. Loading the mapping table of indirect virtual device D2 allows the storage system 100 to load locations of mapping tables that may be stored on the virtual device D1 when D1 was removed. If the mapping table corresponding to virtual device D1 was not loaded, the storage system 100 would not be able to load any mapping tables stored on the virtual device D1 when D1 was removed. FIG. 7 illustrates a flowchart of a process for loading mapping tables corresponding to a first virtual device and a second virtual device, in accordance with an embodiment. The data access module 320 determines 710 an order in which the first virtual device and the second virtual device were removed, and determines 720 an order in which the mapping tables corresponding to the first virtual device and the second virtual device are loaded passed on the order in which the first virtual device and the second virtual device were removed, such as in reverse chronological order.

In an embodiment, a data block is copied to multiple segments. For example, a first portion of the data block is mapped to a first segment and a second portion of the data block is mapped to a second segment. A data block is copied to multiple segments if for example, a source segment has to be copied from a source virtual device and there is no contiguous region of target virtual devices that is large enough to store the entire source segment. As a result, the source segment is split into a plurality of segments when it is copied from the source virtual device to one or more target virtual devices. In these embodiments, the copied data block can only be identified using plurality of locations, each location mapping to a distinct segment. These distinct segments may be stored on the same virtual device or on different virtual devices. The storage system 100 loads the data block by accessing the plurality of segments storing portions of the data block and assembling them together to form the data block.

In an embodiment, the storage system 100 determines that a portion of a source virtual device being removed is highly fragmented. The storage system 100 may determine that a portion of the source virtual device is highly fragmented if the portion stores more than a threshold number of distinct segments. In this situation, the storage system 100 allocates a single target segment in a target virtual device for storing the entire contiguous portion of the source virtual device. Accordingly, several unallocated portions of data may be mapped to the target segment. Using a single target segment to represent the whole contiguous region allows a single segment to be used for representing all segments of this region. This allows for efficient representation of the mapping from source segments to target segments. Instead of storing a large number of entries corresponding to the mapped region of the target devices a single entry is stored in the mapping table. The storage system 100 maps the offsets defining data blocks in the individual segments of the source virtual device being removed to offsets of the target segment in the target virtual device.

In some embodiments, a plurality of physical storage devices may be used for storing data of a virtual device. For example, the storage system 100 may use a plurality of physical devices of a RAID (redundant array of inexpensive disks or redundant array of independent disks) storage such as RAID-Z storage. The plurality of physical storage devices used for representing a virtual device include a parity device for storing parity data and one or more data devices for storing non-parity data, i.e., data that does not represent parity information (e.g., non-parity data 135(a) and parity data 135(b) as illustrated in FIG. 1). The values of data in the parity device can be derived from corresponding data in the remaining devices by computing a function, for example, an XOR function. The parity values can be used to reconstruct values of a physical storage device from the remaining plurality of devices, for example, in case of loss of data from the physical storage device.

The device manager 330 determines the configuration of the plurality of physical storage devices corresponding to a source virtual device being removed. The configuration comprises the number of physical storage devices storing parity information and the number of physical storage devices storing non-parity data. The device manager 330 identifies a target virtual device having a configuration identical to the configuration of the source virtual device being removed. The device manager 330 uses the target virtual device for storing the data of the source virtual device. Furthermore, the segment copying module 340 copies data from the source virtual device to the target virtual device such that data from the parity device of the source virtual device is copied to the parity device of the target virtual device and data from the non-parity data devices of the source virtual device is copied to the non-parity data devices of the target virtual device. Accordingly, the device manager 330 ensures that the data of the non-parity data devices of the source virtual device is not copied to parity device of the target virtual device and correspondingly, the data of the parity device of the source virtual device is not copied to non-parity data devices of the target virtual device.

Data Access Optimization

If multiple virtual devices are removed from a storage pool, each of these removed virtual device is marked as an indirect virtual device. The data access module 320 accesses data pointed at by data pointers (or data block pointers) referring to data stored on these indirect virtual devices using the mapping tables that associate segments of the indirect virtual devices with segments on direct virtual devices. However, this process makes the data access inefficient since it requires a level of indirection via the mapping table.

FIG. 6 shows a flowchart illustrating a process for optimizing performance of data access in the storage system, according to an embodiment of the invention. The data access module 320 receives 610 data access requests based on a data pointer. In an embodiment, the data pointer specifies a virtual device storing the data and an offset within the virtual device specifying the location of the data being accessed. If the data access module 320 determines that the virtual device is a direct virtual device, the data access module 320 accesses the virtual device identified by the data pointer and accesses the data at the offset specified in the data pointer. If the data access module 320 determines that the virtual device is an indirect virtual device, the data access module 320 determines 620 the location of the data based on the mapping table mapping segments previously stored on the indirect virtual device to segments storing the data in direct virtual devices. In an embodiment, the data access module 320 uses the offset value to determine the segment of the indirect virtual device in which the offset was located. The data access module 320 uses the mapping tables to determine the target virtual device to which the data of the segment was copied to. The data access module 320 retrieves the requested data from the target virtual device by translating the offset value to a new offset value within the corresponding segment in the target virtual device. The data access module 320 returns the data retrieved to the module requesting the data. The data access module 320 repeats the steps 610 and 620 while requests to access data on indirect virtual devices are received.

The data access module 320 receives 630 a request to write data on a data block storing a pointer to data on an indirect virtual device. The write request may modify any portion of the data block. The data access module 320 invokes the access optimization module 370 to optimize read requests for data pointers stored on the data block. The access optimization module 370 identifies 640 all (or at least one or more) data pointers stored in the data block that point at data stored on indirect virtual devices. The access optimization module 370 identifies the current locations of data corresponding to each of these data pointers on direct virtual devices using the mapping tables stored in the segment mapping stores 360. The access optimization module 370 updates 650 all the identified pointers that point at data stored on indirect virtual devices to point at the current location of the corresponding data on direct virtual devices of the storage system 100. The access optimization module 370 stores 660 the updated data block.

Subsequent read operations performed using data pointers stored in the data block do not have to access the mapping tables since the updated pointers refer to data stored in direct virtual devices. Accordingly, for subsequent read requests based on data pointers stored in the updated data block, the data access module 320 retrieves 670 data from the new locations on the direct virtual devices storing the data. Accordingly, data access requests are optimized and made efficient since they do not have to access the mapping tables. The access optimization module 370 performs optimization of the pointers when a write operation is performed on a data block rather than when read operations are performed based on the data pointers. As a result, no additional write operations on data blocks are performed for optimizing the data access.

In an embodiment, the access optimization module 370 performs an offline operation when reads/writes are not being performed by the storage system 100 to optimize the data access. Accordingly, the access optimization module 370 identifies data blocks that store data pointers to indirect virtual devices and updates the data pointers to point at the current location of the data on a direct virtual device.

Additional Configuration Considerations

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational mode, object model, hierarchical model or network model.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for managing virtual devices in a storage pool of a storage system. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for managing storage of data, the method comprising:
   storing data in a storage pool comprising multiple virtual devices, wherein data stored on one or more virtual devices points at data stored in other virtual devices of the storage pool, and each virtual device corresponds to one or more physical storage devices and each virtual device comprises one or more segments, each segment representing a contiguous allocated portion of the virtual device;
   receiving a request for removing at least a plurality of virtual devices from the storage pool corresponding to a plurality of source virtual devices;
   removing the plurality of source virtual devices from the storage pool comprising at least a first source virtual device and a second source virtual device, the removing of each source virtual device comprising:
      for each segment of data stored on the source virtual device, copying the data of the segment from the source virtual device to one or more segments on a target virtual device; and
      storing at a selected virtual device from the storage pool, a mapping table corresponding to the source virtual device, comprising mappings from each source segment of the source virtual device to one or more target segments on the target virtual device;
   receiving a request to read data previously stored in a removed virtual device;
   identifying a mapping corresponding to the removed virtual device based upon the mapping tables corresponding to the plurality of source virtual devices, in which the mapping tables are loaded by:
      determining an order in which the first source virtual device and the second source virtual device were removed; and
      determining an order in which mapping tables corresponding the first source virtual device and the second source virtual device are loaded based on the order in which the first source virtual device and the second source virtual device were removed;
   determining the target virtual device to which the accessed requested data is moved based on the mapping; and
   retrieving the requested data from the target virtual device.

2. The method of claim 1, wherein:
   the mapping table corresponding to the first source virtual device is loaded before the mapping table corresponding to the second source virtual device if the first source virtual device was removed after the second source virtual device.

3. The method of claim 1, wherein:
   the mapping tables corresponding to the plurality of removed source virtual devices are loaded in reverse chronological order in which the source virtual devices were removed.

4. The method of claim 1, further comprising, for a source segment stored on the source virtual device:
- determining whether the target virtual device includes a free contiguous storage area that is at least as large as the source segment; and
- responsive to determining that none of the free contiguous storage area is as large as the source segment, storing the data of the source segment across a plurality of segments on the target virtual device.

5. The method of claim 1, further comprising:
- determining whether a number of segments in a contiguous portion of the source virtual device exceeds a threshold value; and
- responsive to the number of segments in the contiguous portion of the source virtual device exceeding a threshold value, allocating a single segment in the target virtual device for storing the contiguous portion of the source virtual device.

6. The method of claim 1, wherein a source virtual device has a configuration comprising a plurality of physical devices storing non-parity data and a physical device storing parity information, the method further comprising, for a source segment on the source virtual device:
- identifying a target virtual device having a configuration matching the configuration of the source virtual device; and
- responsive to identifying a matching target virtual device, copying the source segment from the source virtual device to the target virtual device.

7. The method of claim 6, wherein copying the source segment from the source virtual device to the target virtual device comprises:
- copying data stored on the plurality of physical devices storing non-parity data to a corresponding physical device of the target virtual device storing non-parity data; and
- copying data stored on the physical device storing parity data to a corresponding physical device of the target virtual device storing parity data.

8. The method of claim 6, further comprising:
- receiving a request to write to a data block stored on a first virtual device, the data block storing at least a first pointer to data previously stored on a removed source virtual device;
- identifying one or more other pointers of the data block that point at data blocks stored on any removed source virtual device;
- updating the data block, comprising, for each of a plurality of pointers comprising the first pointer and the one or more other pointers, modifying the pointer to point at a new location of the corresponding data block in the storage pool; and
- storing the updated data block.

9. A non-transitory computer-readable storage medium storing instructions for:
- storing data in a storage pool comprising multiple virtual devices, wherein data stored on one or more virtual devices points at data stored in other virtual devices of the storage pool, and each virtual device corresponds to one or more physical storage devices and each virtual device comprises one or more segments, each segment representing a contiguous allocated portion of the virtual device;
- receiving a request for removing at least a plurality of virtual devices from the storage pool corresponding to a plurality of source virtual devices;
- removing the plurality of source virtual devices from the storage pool comprising at least a first source virtual device and a second source virtual device, the removing of each source virtual device comprising:
  - for each segment of data stored on the source virtual device, copying the data of the segment from the source virtual device to one or more segments on a target virtual device; and
  - storing at a selected virtual device from the storage pool, a mapping table corresponding to the source virtual device, comprising mappings from each source segment of the source virtual device to one or more target segments on the target virtual device;
- receiving a request to read data previously stored in a removed virtual device;
- identifying a mapping corresponding to the removed virtual device based upon the mapping tables corresponding to the plurality of source virtual devices, in which the mapping tables are loaded by:
  - determining an order in which the first source virtual device and the second source virtual device were removed; and
  - determining an order in which mapping tables corresponding the first source virtual device and the second source virtual device are loaded based on the order in which the first source virtual device and the second source virtual device were removed;
- determining the target virtual device to which the accessed requested data is moved based on the mapping; and
- retrieving the requested data from the target virtual device.

10. The non-transitory computer-readable storage medium of claim 9, wherein:
- the mapping tables corresponding to the plurality of removed virtual devices are loaded in reverse chronological order in which the virtual devices were removed.

11. The non-transitory computer-readable storage medium of claim 9, further comprising storing instructions for:
- determining whether the target virtual device includes a free contiguous storage area that is at least as large as the source segment; and
- responsive to determining that none of the free contiguous storage area is as large as the source segment, storing the data of the source segment across a plurality of segments on the target virtual device.

12. The non-transitory computer-readable storage medium of claim 9, further comprising storing instructions for:
- determining whether a number of segments in a contiguous portion of the source virtual device exceeds a threshold value; and
- responsive to the number of source segments in the portion of the source virtual device exceeding a threshold value, allocating a single segment in the target virtual device for storing the contiguous portion of the source virtual device.

13. The non-transitory computer-readable storage medium of claim 9, wherein a source virtual device has a configuration comprising a plurality of physical devices storing non-parity data and a physical device storing parity information, which further comprises storing instructions for a source segment on the source virtual device:

identifying a target virtual device having configuration matching the configuration of the source virtual device; and responsive to identifying a matching target virtual device, copying the source segment from the source virtual device to the target virtual device.

14. The non-transitory computer-readable storage medium of claim 13, wherein copying the source segment from the source virtual device to the target virtual device comprises:

copying data stored on the plurality of physical devices storing non-parity data to a corresponding physical device of the target virtual device storing non-parity data; and copying data stored on the physical device storing parity data to a corresponding physical device of the target virtual device storing parity data.

15. A computer system comprising:

a computer processor; and a non-transitory computer-readable storage medium storing instructions for execution by the computer processor, the instructions for:

storing data in a storage pool comprising multiple virtual devices, wherein data stored on one or more virtual devices points at data stored in other virtual devices of the storage pool, and each virtual device corresponds to one or more physical storage devices and each virtual device comprises one or more segments, each segment representing a contiguous allocated portion of the virtual device;

receiving a request for removing at least a plurality of virtual devices from the storage pool corresponding to a plurality of source virtual devices;

removing the plurality of source virtual devices from the storage pool comprising at least a first source virtual device and a second source virtual device, the removing of each source virtual device comprising:

for each segment of data stored on the source virtual device, copying the data of the segment from the source virtual device to one or more segments on a target virtual device; and storing at a selected virtual device from the storage pool, a mapping table corresponding to the source virtual device, comprising mappings from each source segment of the source virtual device to one or more target segments on the target virtual device;

receiving a request to read data previously stored in a removed virtual device;

identifying a mapping corresponding to the removed virtual device based upon the mapping tables corresponding to the plurality of source virtual devices, in which the mapping tables are loaded by:

determining an order in which the first source virtual device and the second source virtual device were removed; and determining an order in which mapping tables corresponding the first source virtual device and the second source virtual device are loaded based on the order in which the first source virtual device and the second source virtual device were removed;

determining the target virtual device to which the accessed requested data is moved based on the mapping; and retrieving the requested data from the target virtual device.

16. The computer system of claim 15, wherein:

the mapping tables corresponding to the plurality of removed virtual devices are loaded in reverse chronological order in which the virtual devices were removed.

17. The computer system of claim 15, further comprising:

determining whether the target virtual device includes a free contiguous storage area that is at least as large as the source segment; and responsive to determining that none of the free contiguous storage area is as large as the source segment, storing the data of the source segment across a plurality of segments on the target virtual device.

18. The computer system of claim 15, further comprising:

determining whether a number of segments in a contiguous portion of the source virtual device exceeds a threshold value; and responsive to the number of segments in the contiguous portion of the source virtual device exceeding a threshold value, allocating a single segment in the target virtual device for storing the contiguous portion of the source virtual device.

19. The computer system of claim 15, wherein a source virtual device has a configuration comprising a plurality of physical devices storing non-parity data and a physical device storing parity information, which further comprises storing instructions for a source segment on the source virtual device:

identifying a target virtual device having configuration matching the configuration of the source virtual device; and responsive to identifying a matching target virtual device, copying the source segment from the source virtual device to the target virtual device.

* * * * *